United States Patent
Tristram et al.

(10) Patent No.: US 11,388,920 B2
(45) Date of Patent: Jul. 19, 2022

(54) STORAGE AND DELIVERY SYSTEM

(71) Applicant: TRISCO ICAP PTY LTD, Brisbane (AU)

(72) Inventors: Michael Tristram, Queensland (AU); Ian Tristram, Queensland (AU); Brenda Mossel, Queensland (AU); Peter Skarshewski, Queensland (AU)

(73) Assignee: Trisco ICAP Pty Ltd, Brisbane (AU)

( * ) Notice: Subject to any disclaimer, the term of this patent is extended or adjusted under 35 U.S.C. 154(b) by 45 days.

(21) Appl. No.: 16/330,664

(22) PCT Filed: Sep. 6, 2017

(86) PCT No.: PCT/AU2017/050966
§ 371 (c)(1),
(2) Date: Mar. 5, 2019

(87) PCT Pub. No.: WO2018/045419
PCT Pub. Date: Mar. 15, 2018

(65) Prior Publication Data
US 2019/0191751 A1 Jun. 27, 2019

(30) Foreign Application Priority Data
Sep. 6, 2016 (AU) .............................. 2016903574

(51) Int. Cl.
| | | |
|---|---|---|
| *A23L 29/269* | (2016.01) | |
| *A23L 29/256* | (2016.01) | |
| *A23L 29/238* | (2016.01) | |
| *A23L 29/244* | (2016.01) | |
| *A23L 29/262* | (2016.01) | |
| *A23L 29/231* | (2016.01) | |
| *A23L 29/25* | (2016.01) | |
| *B65D 25/38* | (2006.01) | |
| *A23L 33/00* | (2016.01) | |

(52) U.S. Cl.
CPC ........... *A23L 29/272* (2016.08); *A23L 29/231* (2016.08); *A23L 29/238* (2016.08); *A23L 29/244* (2016.08); *A23L 29/25* (2016.08); *A23L 29/256* (2016.08); *A23L 29/262* (2016.08); *A23L 29/269* (2016.08); *A23L 29/27* (2016.08); *A23L 29/271* (2016.08); *A23L 29/273* (2016.08); *A23L 33/40* (2016.08); *B65D 25/38* (2013.01); *A23V 2002/00* (2013.01)

(58) Field of Classification Search
CPC ...... A23L 29/27; A23L 29/269; A23L 29/273; A23L 29/274; A23L 29/262; A23L 29/231; A23L 29/272; A23L 29/244; A23L 29/256; A23L 29/271; A23L 29/20; A23L 33/40; A23L 33/21; B65D 25/38; B65D 25/40; B65D 25/42
See application file for complete search history.

(56) References Cited

U.S. PATENT DOCUMENTS

| | | | |
|---|---|---|---|
| 3,750,908 A | 8/1973 | Acuff et al. | |
| 5,579,959 A | 12/1996 | Bennett et al. | |
| 6,013,294 A | 1/2000 | Bunke et al. | |
| 6,455,090 B1 | 9/2002 | Uzuhashi et al. | |
| 2004/0197456 A1 | 10/2004 | Holahan | |
| 2008/0035677 A1* | 2/2008 | Daansen ............ | B65D 47/2031 222/310 |
| 2010/0247714 A1 | 9/2010 | Massey et al. | |

FOREIGN PATENT DOCUMENTS

| | | |
|---|---|---|
| CN | 105658225 A | 6/2016 |
| WO | 2004/069179 | 8/2004 |
| WO | 2011/140598 | 11/2011 |
| WO | 2015061789 A2 | 4/2015 |

OTHER PUBLICATIONS

Omer et al., "The Emulsifying Stability of Gum Arabic using the Local Sesame Oil Obtained from AL-BAHA Area", 2015, International Journal of Engineering Research & Technology, vol. 4, issue 2, pp. 1172-1175 (Year: 2015).*
International Search Report and Written Opinion corresponding to International Application No. PCT/AU2017/050966 dated Nov. 15, 2017.
Glicksman, Martin , "Gum Technology in the Food Industry", Food Science and Technology pp. 23-25, and 32-33 (1969).
Bubnik, Z , et al., "Solubility of saccharides", In: Sugar Technologists Manual pp. 124-134.
Mitchell, Helen L, "The Role of the bulking agent polydextrose in fat replacement", In: Handbook of Fat Replacers, Roller S, Jones SA, Eds. CRC Press: Boca Raton, Chp. 11:235-249 (1996).
"Office Action corresponding to Chinese Application No. 2017300676675 dated Feb. 7, 2022".

* cited by examiner

*Primary Examiner* — Jeffrey P Mornhinweg
*Assistant Examiner* — Kelly P Kershaw
(74) *Attorney, Agent, or Firm* — Myers Bigel, P.A.

(57) ABSTRACT

Provided is a storage and delivery system that includes a container containing a stable liquid composition therein for increasing the viscosity of an aqueous liquid or aqueous liquid solid mixture foodstuff and having a viscosity of less than 2000 cP and a water activity of greater than 95%, wherein the composition comprises one or more thickening agents and one or more polysaccharides, and a pump dispenser sealingly attached to the container and having a valve for inhibiting or preventing drying of the composition in the container. Further provided is a method of delivering a stable liquid composition to an aqueous liquid or aqueous liquid solid mixture foodstuff by use of the storage and delivery system. A method for increasing the viscosity of an aqueous liquid or aqueous liquid solid mixture foodstuff by adding the stable liquid composition thereto is also provided.

17 Claims, 2 Drawing Sheets

| Classification | Level | Description | Target viscosity range | Level of precision achieved with current invention | Typical precision achieved with current invention |
|---|---|---|---|---|---|
| Mildly thick | 150 | nectar consistency | 110-190 mPa.s | 130-170 mPa.s | |
| Moderately thick | 400 | honey consistency | 300-500 mPa.s | 350-450 mPa.s | |
| Extremely thick | 900 | pudding consistency | 750-1000 mPa.s | 825-975 mPa.s | |

| Film | Description | MVTR (g/m²) |
|---|---|---|
| Foil | Aluminium | 0 |
| MPET | Metalised Polyester | 1.2 |
| KPET | Saran coated PET | 7.55 |
| OPP | Polyproylene | 8 |

FIG. 5

STORAGE AND DELIVERY SYSTEM

STATEMENT OF PRIORITY

The present application is a 35 U.S.C. § 371 national phase application of PCT Application PCT/AU2017/050966 filed Sep. 6, 2017, which claims priority from Australian provisional patent application number 2016903574 filed on 6 Sep. 2016, the entire contents of each of which are incorporated herein by cross-reference in its entirety.

FIELD OF THE INVENTION

This invention relates to a storage and delivery system and method of use thereof. In particular, the invention relates to a storage and delivery system for a stable liquid composition comprising a thickening agent and a polysaccharide suitable for the increasing the viscosity of a liquid or semi-liquid foodstuff.

BACKGROUND TO THE INVENTION

It is often desirable to provide viscous thickened liquids, particularly for the geriatric and convalescent markets. The thickened liquids need to be of a particular, known and repeatable viscosity to be applicable to these markets.

Predetermined liquid viscosities have been developed by a number of regulatory bodies that are considered to have a clinically significant benefit in 'slowing down' a dysphagia patient's swallow so that common co-morbidities of the disorder, such as aspiration pneumonia, are prevented. In light of the varying severity of swallowing disorders, the following professional guidelines are generally practiced clinically: mildly thick (nectar consistency); moderately thick (honey consistency); and thick (pudding consistency). These guidelines typically correlate to 150, 400 and 900 mPa·s, respectively.

These viscosity levels have now been included in a new international framework called the IDDSI (International Dysphagia Diet Standardisation Initiative) Framework and described as Level 2—Slightly Thick, Level 3—Moderately Thick, and Level 3—Extremely Thick. The IDDSI Framework not only describes the subjective attributes of the three consistency levels but also prescribes an objective test (the IDDSI Flow Test) with tightly defined ranges of measurement to ensure strict compliance with the consistency that is desired to be achieved. Non-compliance with these consistency parameters increase the risk of an unsafe swallow by a person with dysphagia that can lead to serious complications as mentioned above and could lead to death in frail and elderly patients.

Thickening beverages for the management of dysphagia in institutions and homes is typically achieved using powdered thickeners, which have been "instantised' through physical modification such as agglomeration.

Such powders, however, can have limitations. Firstly, specialised mixing equipment is typically required for the preparation of thickened foodstuffs for dysphagic patients in order to obtain sufficient shear forces to ensure adequate dispersion, which despite this is typically less than ideal. By way of example, hydrocolloids generally require considerable shear forces in order to express their viscosity. Such shear forces can be provided through homogenization, such as with high-shear mixers or staged pressure homogenizers, which can result in pressures such as 250 mPa. In institutions and patient homes, however, homogenization is typically carried out simply using hand held whisks or by hand stirring with utensils such as forks. Accordingly, the resultant dispersion is not ideal. Further, air incorporated during the mixing process, may result in a beverage of a whipped consistency. Moreover, the time taken for powdered thickeners to express their viscosity is typically not instantaneous (i.e., <30 secs), but rather may take up to several minutes to bring a foodstuff to its maximal or desired viscosity. Commercially available gel thickening agents that function by way of expressing the viscosity of the thickening agent in a concentrated solution and diluting back to a desired concentration, are similarly limited by the amount of shear required to disperse and express their viscosity.

Secondly, powdered thickeners are measured volumetrically using scoops provided by the manufacturer. Due to the inherent nature of powders, their delivered volumes may be significantly inaccurate as the bulk density of the powder is affected by, for example, the degree of packing. The degree of packing is further influenced by the uptake of moisture into the powder on exposure to the atmosphere, the degree of compression in scooping and/or the effects of vibration thereof. Additionally, it can be difficult to quantify or predict the degree of inaccuracy with respect to the delivery of a powdered thickener quantitatively. However, it would be appreciated that it may be in the vicinity of as much as +/−20%. Accordingly, such thickeners fail to consistently and repeatedly deliver a pre-determined viscosity when added to a particular foodstuff.

Thus, there remains a need for a liquid thickener delivery system that may be used, for example, to feed subjects suffering from a mastication and/or deglutition disorder, such as dysphagia, which overcomes one or more of the inherent limitations of commercially available gel and/or powdered thickener delivery systems.

SUMMARY OF THE INVENTION

In a first aspect, the invention provides a storage and delivery system for a stable liquid composition, comprising:

(a) a container containing the stable liquid composition, said composition for increasing the viscosity of an aqueous liquid or aqueous liquid solid mixture foodstuff and having a viscosity of less than 2000 cP and a water activity of greater than 95%, wherein the composition comprises: (i) one or a plurality of thickening agents selected from the group consisting of agar, alginic acid, carrageenan, guar gum, gum tragacanth, gum ghatti, microcrystalline cellulose, methyl cellulose, hydroxypropylmethylcellulose, hydroxypropylcellulose, methylethylcellulose, gum karaya, locust bean gum, tara gum, psyllium seed gum, quince seed gum, a pectin, furcellaran, gellan gum, konjac, sodium alginate, xanthan gum and any combination thereof; and (ii) one or a plurality of polysaccharides or extracts thereof selected from the group consisting of scleroglucan, dextran, elsinan, soy bean polysaccharide, levan, an arabinogalactan, alternan, inulin, a gluco-oligosaccharide, pullulan, an arabinoxylan, curdlan, low viscosity carboxymethylcellulose (CMC), an *Acacia* gum, a *Larix occidentalis* polysaccharide extract, a *Larix laricina* polysaccharide extract, a *Larix decidua* polysaccharide extract, a *Larix sibirica* polysaccharide extract, and any combination thereof; and (b) a pump dispenser sealingly attached to the container, said dispenser comprising a valve for inhibiting or preventing drying of the composition in the container.

Suitably, the composition is configured to be delivered in one or more doses of a predetermined volume to the foodstuff. Preferably, one, two and three doses of the predetermined volume of the composition increase the viscosity of said foodstuff to first, second and third viscosity levels respectively and wherein a nonlinear relationship exists between the first, second and third viscosity levels.

In a second aspect, the invention provides a method of delivering a stable liquid composition to an aqueous liquid or aqueous liquid solid mixture foodstuff comprising the steps of:

(a) providing a container containing the stable liquid composition, said composition for increasing the viscosity of said foodstuff and having a viscosity of less than 2000 cP and a water activity of greater than 95%, wherein the composition comprises: (i) one or a plurality of thickening agents selected from the group consisting of agar, alginic acid, carrageenan, guar gum, gum tragacanth, gum ghatti, microcrystalline cellulose, methyl cellulose, hydroxypropylmethylcellulose, hydroxypropylcellulose, methylethylcellulose, gum karaya, locust bean gum, tara gum, psyllium seed gum, quince seed gum, a pectin, furcellaran, gellan gum, konjac, sodium alginate, xanthan gum and any combination thereof; and (ii) one or a plurality of polysaccharides or extracts thereof selected from the group consisting of sceroglucan, dextran, elsinan, soy bean polysaccharide, levan, an arabinogalactan, alternan, inulin, a gluco-oligosaccharide, pullulan, an arabinoxylan, curdlan, low viscosity carboxymethylcellulose (CMC), an *Acacia* gum, a *Larix occidentalis* polysaccharide extract, a *Larix laricina* polysaccharide extract, a *Larix decidua* polysaccharide extract, a *Larix sibirca* polysaccharide extract and any combination thereof, wherein the container is further sealingly attached to a pump dispenser, said dispenser comprising a valve for inhibiting or preventing drying of the composition in the container; and (b) applying a force to the pump dispenser to thereby deliver one or more doses of a predetermined volume of the composition to the foodstuff.

In one embodiment, one, two and three doses of the predetermined volume of the composition increase the viscosity of said foodstuff to first, second and third viscosity levels respectively and wherein a nonlinear relationship exists between the first, second and third viscosity levels.

In particular embodiments, the method of the present aspect further comprises the step of applying low-shear mixing to the foodstuff and the composition so as to promote increasing the viscosity of said foodstuff by the composition.

In referring to the invention of the first and second aspects, the dispenser suitably comprises a dispenser tip, the dispenser tip including the valve disposed therein.

Suitably, the aforementioned valve is or comprises a self-sealing valve. In particular embodiments, the aforementioned valve is selected from the group consisting of a cross-slit valve, a ball valve, a flapper valve, an umbrella valve, a duck bill valve, a reed valve and any combination thereof.

In particular embodiments of the first and second aspects, the valve is biased to a closed position and is actuated to an open position upon application of a force to the pump dispenser forcing said composition to flow through the valve.

In a third aspect, the invention provides a method for increasing the viscosity of an aqueous liquid or aqueous liquid solid mixture foodstuff, the method including the steps of:

(a) adding to the foodstuff a stable liquid composition having a viscosity of less than 2000 cP and a water activity of greater than 95%, the composition comprising: (i) one or a plurality of thickening agents selected from the group consisting of agar, alginic acid, carrageenan, guar gum, gum tragacanth, gum ghatti, microcrystalline cellulose, methyl cellulose, hydroxypropylmethylcellulose, hydroxypropylcellulose, methylethylcellulose, gum karaya, locust bean gum, tara gum, psyllium seed gum, quince seed gum, a pectin, furcellaran, gellan gum, konjac, sodium alginate, xanthan gum and any combination thereof; and (ii) one or a plurality of polysaccharides or extracts thereof selected from the group consisting of scleroglucan, dextran, elsinan, soy bean polysaccharide, levan, an arabinogalactan, alternan, inulin, a gluco-oligosaccharide, pullulan, an arabinoxylan, curdlan, low viscosity carboxymethylcellulose (CMC), an *Acacia* gum, a *Larix occidentalis* polysaccharide extract, a *Larix laricina* polysaccharide extract, a *Larix decidua* polysaccharide extract, a *Larix sibirica* polysaccharide extract and any combination thereof; and (b) applying low-shear mixing to the foodstuff and the composition so as to promote increasing the viscosity of said foodstuff by the composition.

Suitably, for the method of the two aforementioned aspects, the low-shear mixing is applied for about 30 seconds or less to achieve a maximal viscosity of the foodstuff. Preferably, the low-shear mixing is applied for about 10 to about 30 seconds to achieve a maximal viscosity of the foodstuff.

In particular embodiments of the method of the second and third aspects, low-shear mixing comprises stirring at a speed of from about 10 rpm to about 40 rpm.

In a fourth aspect, the invention provides a stable liquid composition having a viscosity of less than 2000 cP and a water activity of greater than 95%, the composition comprising: (i) one or a plurality of thickening agents selected from the group consisting of agar, alginic acid, carrageenan, guar gum, gum tragacanth, gum ghatti, microcrystalline cellulose, methyl cellulose, hydroxypropylmethylcellulose, hydroxypropylcellulose, methylethylcellulose, gum karaya, locust bean gum, tara gum, psyllium seed gum, quince seed gum, a pectin, furcellaran, gellan gum, konjac, sodium alginate, xanthan gum and any combination thereof; and (ii) one or a plurality of polysaccharides or extracts thereof selected from the group consisting of scleroglucan, dextran, elsinan, soy bean polysaccharide, levan, an arabinogalactan, alternan, inulin, a gluco-oligosaccharide, pullulan, an arabinoxylan, curdlan, low viscosity carboxymethylcellulose (CMC), an *Acacia* gum, a *Larix occidentalis* polysaccharide extract, a *Larix laricina* polysaccharide extract, a *Larix decidua* polysaccharide extract, a *Larix sibirica* polysaccharide extract and any combination thereof, wherein addition of the composition to an aqueous liquid or aqueous liquid solid mixture foodstuff increases the viscosity of said foodstuff.

With respect to the above aspects, the viscosity of the foodstuff is suitably increased to greater than 95 cP.

In certain embodiments of the aforementioned aspects, the composition is stable for at least six months at room temperature.

In referring to the above aspects, the foodstuff of increased viscosity is suitably for feeding a subject suffering from a mastication and/or deglutition disease, disorder or condition. Preferably, the mastication and/or deglutition disease, disorder or condition is or comprises dysphagia.

As used herein, except where the context requires otherwise, the term "comprise" and variations of the term, such as "comprising", "comprises" and "comprised", are not intended to exclude further elements, components, integers or steps but may include one or more unstated further elements, components, integers or steps.

It will be appreciated that the indefinite articles "a" and "an" are not to be read as singular indefinite articles or as otherwise excluding more than one or more than a single subject to which the indefinite article refers. For example, "a" polysaccharide includes one polysaccharide, one or more polysaccharides and a plurality of polysaccharides.

BRIEF DESCRIPTION OF THE DRAWINGS

To assist in understanding the invention and to enable a person skilled in the art to put the invention into practical effect, preferred embodiments of the invention will be described by way of example only with reference to the accompanying drawings, in which.

DETAILED DESCRIPTION OF THE INVENTION

The invention advantageously provides a storage and delivery system for a liquid composition having a water activity greater than 95%, comprising a thickening agent and a polysaccharide, which is flowable and stable. Such a system can repeatedly, consistently and accurately provide doses of the liquid composition through use of, for example, a pump dispenser, or a pre-determined single serve volume. Surprisingly, the liquid composition can be control released and viscosity expressed when dispersed in liquid or semi-liquid foodstuffs using low shear mixing forces (e.g., gentle mixing with a spoon) so as to express its viscosity therein rapidly (e.g., <30 secs). Using the storage and delivery system of the invention, an increase in viscosity of a food or beverage of interest can be predictably and reliably produced.

In one aspect, the invention provides a storage and delivery system for a stable liquid composition, comprising:

(a) a container containing the stable liquid composition, said composition for increasing the viscosity of an aqueous liquid or aqueous liquid solid mixture foodstuff and having a viscosity of less than 2000 cP and a water activity of greater than 95%, wherein the composition comprises: (i) one or a plurality of thickening agents selected from the group consisting of agar, alginic acid, carrageenan, guar gum, gum tragacanth, gum ghatti, microcrystalline cellulose, sodium carboxymethylcellulose, methyl cellulose, hydroxypropylmethylcellulose, hydroxypropylcellulose, methylethylcellulose, gum karaya, locust bean gum, tara gum, psyllium seed gum, quince seed gum, a pectin, furcellaran, gellan gum, konjac, sodium alginate, xanthan gum and any combination thereof; and (ii) one or a plurality of polysaccharides or extracts thereof selected from the group consisting of scleroglucan, dextran, elsinan, soy bean polysaccharide, levan, an arabinogalactan, alternan, inulin, a gluco-oligosaccharide, pullulan, an arabinoxylan, curdlan, low viscosity carboxymethylcellulose (CMC), an *Acacia* gum, a *Larix occidentalis* polysaccharide extract, a *Larix laricina* polysaccharide extract, a *Larix decidua* polysaccharide extract, a *Larix sibirica* polysaccharide extract and any combination thereof; and (b) a pump dispenser sealingly attached to the container, said dispenser comprising a valve for inhibiting or preventing drying of the composition in the container.

The term "thickening agent" as used herein refers to those compounds provided above that are used to increase the viscosity of a liquid mixture and/or solution, and in particular, those for use in food applications, including edible gums, vegetable gums and food-grade polysaccharides.

Gel compositions for thickening or increasing the viscosity of a foodstuff are known in the art. By way of example, US2004/0197456 (hereinafter "Holahan") describes a gel thickener intended for people with swallowing disorders. The invention disclosed in Holahan, however, describes a gel composition having a thickening agent concentrated to several times its intended usage level. Unlike the controlled-release technology described herein, the gel thickener of Holahan comprises a thickening agent that already has its viscosity fully expressed therein and, so, which is fully hydrated even before addition to a foodstuff, after which Holahan's gel thickener is simply then added at a volume such that the now diluted gel thickener expresses the desired viscosity in the foodstuff.

The present invention is predicated at least in part on the finding that the water binding ability of particular thickening agents can be modulated and/or controlled to produce specific degrees of viscosity inhibition by the addition of one or a plurality of polysaccharides, such as those hereinbefore described. Additionally, these polysaccharides may further control the rate and extent that their viscosity inhibition is released and/or reversed upon dilution of the liquid composition.

The term "polysaccharide", as used herein, generally refers to polymers formed from about 10 to over 100,000 saccharide units linked to each other by hemiacetal or glycosidic bonds. The polysaccharide may be either a straight chain, singly branched, or multiply branched wherein each branch may have additional secondary branches, and the monosaccharides may be standard D- or L-cyclic sugars in the pyranose (6-membered ring) or furanose (5-membered ring) forms such as D-fructose and D-galactose, respectively. Additionally, they may be cyclic sugar derivatives, deoxy sugars, sugar, sugar acids, or multi-derivatized sugars. As would be understood by the skilled artisan, polysaccharide preparations, and in particular those isolated from nature, typically comprise molecules that are heterogeneous in molecular weight.

It would be readily understood, that water activity or aw is defined as the ratio of the partial vapour pressure of water in a material to the standard state partial vapour pressure of water at the same temperature. Additionally, water generally migrates from areas of high water activity to areas of low water activity. For example, the liquid composition provided herein has a water activity in excess of 95% (e.g., about or in excess of 95.5%, 96%, 96.5%, 97%, 97.5%, 98%, 98.5%, 99%, 99.5% and any range therein), which then typically requires protection from atmospheres or environments with a relative humidity of less than 95%, those as those shown in FIG. 4, so as to prevent the liquid composition from drying out during storage and before delivery or dispensing.

Accordingly, the storage and delivery system of the present aspect preferably comprises a pump dispenser, or another sealed delivery system as are known in the art, that: (1) delivers a consistent dose or volume (e.g., +/−3% to 5% by weight) of the liquid composition described herein upon use and through the entire content or volume of the storage and delivery system in which it is sold; and (2) is able to protect the liquid composition from the drying effect of an atmosphere or environment having a relative humidity below 95% whilst contained or stored within the storage and delivery system.

Accordingly, the storage and delivery system preferably provides a relatively precise and/or accurate dose or volume of the liquid composition to the desired foodstuff. In particular embodiments, delivery of the liquid composition by the storage and delivery system of the invention to the foodstuff results in a viscosity thereof that is within at least +/−7.5% (e.g., +/−0.5%, 1%, 1.5%, 2%, 2.5%, 3%, 3.5%, 4%, 4.5%, 5%, 5.5%, 6%, 6.5%, 7%, 7.5% and any range therein) of the desired or pre-determined viscosity of said foodstuff. More preferably, delivery of the liquid composition by the storage and delivery system of the invention to the foodstuff results in a viscosity thereof that is within at least +/−3.5% of the desired or pre-determined viscosity of said foodstuff.

Commercially available pump dispensers known in the art typically do not have the accuracy to be used in combination with the liquid composition described herein for the management of dysphagia. Dose accuracy of at least +/−7.5%, and even more preferably at least +/−3% is normally required to achieve the consistency requirements of, for example, the IDDSI Framework, whereas commercially available pump dispensers more typically have accuracies of about +/−10-20%. Even a pump dispenser that is specifically designed to achieve a +/−3% accuracy preferably has features like top and bottom ball valves incorporated to prevent flow back of the liquid composition during operation thereof.

This deficiency is further accentuated if the volume dispensed by such prior art pumps is to be restricted to a lower volume than that typically dispensed (e.g., restricting a 30 mL dispenser to rather dispense a 20, 15, 10 or 5 mL volume). This is important to the functioning of the present invention, as the dispenser preferably dispenses a volume of about 15 mL or less (e.g., about 15, 14, 13, 12, 11, 10, 9, 8, 7, 6, 5, 4, 3, 2, 1 mL), more preferably about 10 mL or less, and even more preferably about 5 mL or less.

Additionally, pump dispensers of the prior art, such as those provided in WO2003028898 and U.S. Pat. No. 5,579,959, are generally not suitable to be used in the present storage and delivery system, as they are designed to be washed and reused. Conversely, the pump dispenser described herein is preferably disposable or for a single use so as to prevent the stability of the liquid composition contained therein being compromised by the introduction of bacterial contamination. As will be appreciated by the skilled person, such contamination is unacceptable in a vulnerable population like the elderly. Such prior art pumps typically need the resistance of a viscous product to function appropriately, while the liquid composition of the present invention is viscosity-inhibited and hence not viscous.

Accordingly, the pump dispenser is preferably configured to inhibit and/or prevent microbial contamination of the liquid composition, such as by the inclusion of a self sealing valve described herein, the single use design and/or sealing engagements at one or more possible entry points for microbes into the dispenser and/or container.

Preferably, the present storage and delivery system is configured to achieve the required viscosity levels of, for example, the IDDSI Framework, or other pre-determined levels as required by a user, by a whole or specific number of pumps (e.g., 1, 2, 3 etc) that correspond with each level of consistency. By way of example, a single pump of the liquid composition from the present storage and delivery system when administered to a specific volume of liquid (e.g., 100 mL), produces a viscosity of about 120 to about 180 mPa·s. Further to this, two and three pumps of the liquid composition produce viscosities of about 350 to about 450 mPa·s and about 850 to about 950 mPa·s respectively when added to the same specific volume of liquid.

Accordingly, the liquid composition is preferably formulated such that a doubling and/or tripling of dose or volume, when added to a uniform volume of liquid or semi-liquid foodstuff, produces pre-determined viscosities, including in a non-linear fashion, such as those required by international standards for the management of dysphagia (e.g., IDDSI Framework).

Therefore, in particular embodiments, the composition is configured to be delivered in one or more doses of a predetermined volume to the foodstuff, such that one, two and three doses of the predetermined volume of the composition suitably increase the viscosity of said foodstuff to first, second and third viscosity levels respectively and wherein a nonlinear relationship exists between the first, second and third viscosity levels. In one embodiment, the first viscosity level is about 120 to about 180 mPa·s (e.g., about 120, 125, 130, 135, 140, 145, 150, 155, 160, 165, 170, 175, 180 mPa·s and any range therein), the second viscosity level is about 350 to about 450 mPa·s (e.g., about 350, 355, 360, 365, 370, 375, 380, 385, 390, 395, 400, 405, 410, 415, 420, 425, 430, 435, 440, 445, 450 mPa·s and any range therein) and/or the third viscosity level is about 850 to about 950 mPa·s (e.g., about 850, 855, 860, 865, 870, 875, 880, 885, 890, 895, 900, 905, 910, 915, 920, 925, 930, 935, 940, 945, 950 mPa·s and any range therein).

Figure 1:
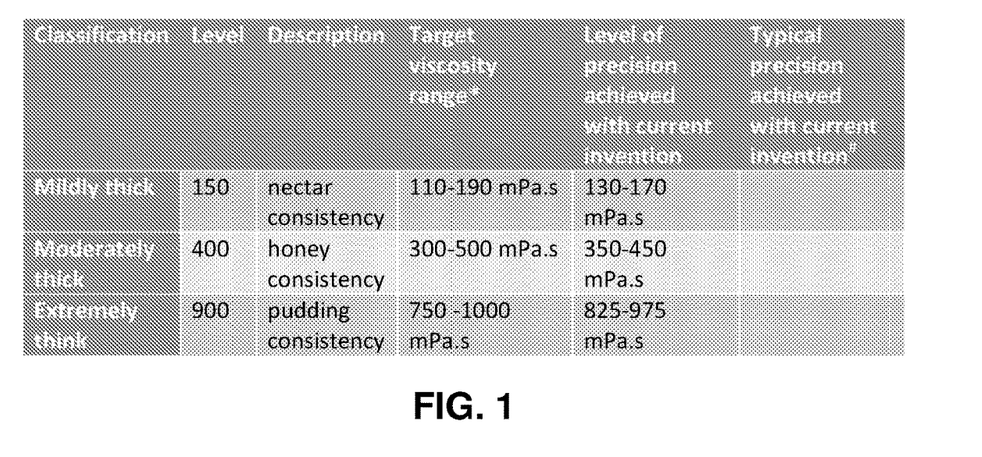
FIG. 1 provides target ranges for the viscosity of liquids thickened by, for example, a liquid and/or powdered thickener, in milliPascal seconds (mPa·s) for the three consistency levels as per Hadde et al. (Int J Speech Lang Pathol, 2016)
Figure 2:
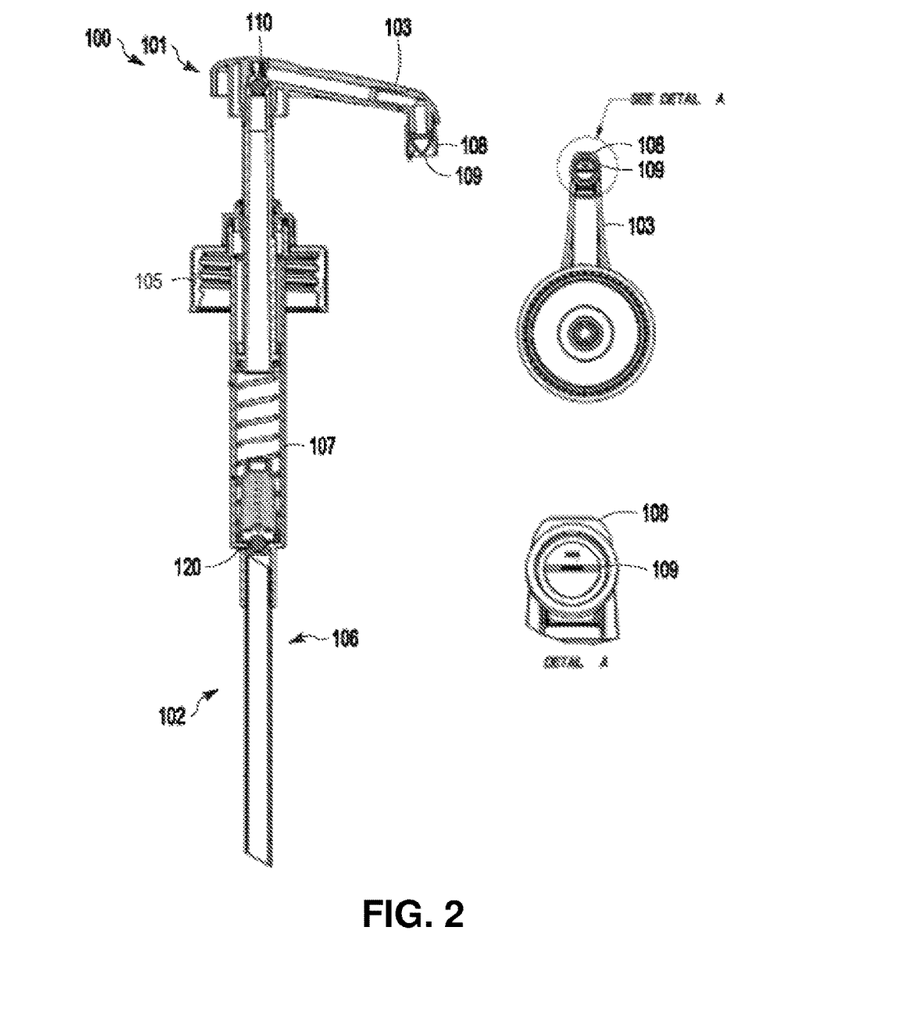
FIG. 2 provides longitudinal cross-sectional and close-up views of an embodiment of a pump dispenser of the invention.

In FIG. 2, an embodiment of a suitable pump dispenser 100 is provided. The pump dispenser 100 includes a lid 105 for screwingly engaging a storage container (not shown) containing a liquid composition formulated for increasing the viscosity of a foodstuff. As can be seen from FIG. 2, a dispensing shaft 106 in fluid communication with the storage container extends longitudinally through the lid 105 from a bottom end 102 to a top end 101 of the pump dispenser 100. The dispenser shaft 106 includes a spring-based pump element 107 adapted for drawing up and moving the liquid composition through the dispensing shaft 106 upon actuation of the pump dispenser 100. The dispenser shaft 106 further comprises a first ball valve 110 disposed therein at the top end 101 of the pump dispenser 100 and a second ball valve 120 disposed therein at a bottom end 102 of the pump dispenser 100. This arrangement of the first and second ball valves 110, 120 allow for a charge or dose of the liquid composition to be held indefinitely without any leakage from the top end 101 or the bottom end 102 of the pump dispenser 100. This ensures that the volume or dose of the liquid composition that is drawn into the pump dispenser 100 will be consistent when it is discharged regardless of the time elapsed between uses thereof.

In this respect, particular types of valves 110, 120, such as flapper valves and light weight ball valves, may be more prone to leakage or drainage over time. With regards to light weight ball valves, such as those comprising glass or a polymeric material, these may not be heavy enough to quickly or immediately re-engage with the respective top and bottom ends 101, 102 of the pump dispenser 100 after dispensing of a dose of the liquid composition contained therein. This deficiency of light weight ball valves is further accentuated by the liquid nature of the liquid composition. Accordingly, one or both of the valves 110, 120 are preferably configured to rapidly re-engage the respective top and bottom ends 101, 102 of the pump dispenser 100 after use thereof. In one preferred embodiment, one or both of the valves 110, 120 comprise a metallic material, such as stainless steel or the like, suitable for inclusion in the dispenser 100.

In referring to FIG. 2, the pump dispenser 100 further includes a dispenser tip 103 in fluid communication with the dispenser shaft 106. The dispenser tip 103 includes a flexible rubber duck bill-type third valve 109 at an open distal end portion 108 of the dispenser tip 103, which remains closed when there is no flow of the liquid composition through it, and only opens when the flow of the liquid composition exerts pressure on the third valve 109 to open it and allow discharge or dispensing thereof. Once flow of the liquid composition ceases, the third valve 109 closes to thereby protect the liquid composition remaining inside the pump dispenser 100 and the storage container from the outside atmosphere and prevents it from drying out therein. Accordingly, the third valve 109 is adapted to be biased to a closed position when the pump dispenser 100 is not in use, but is actuated to an open position upon application of a force to the pump dispenser 100 forcing said composition to flow through the third valve 109.

It would be appreciated that other valves as are known in the art may be used for the present invention. To this end, the valve or valve mechanism (e.g., the first, second and/or third valves described herein) is preferably a self sealing valve. In particular embodiments, the valve is selected from the groups consisting of a cross-slit valve, a ball valve, a flapper valve, an umbrella valve, a duck bill valve, a reed valve and any combination thereof.

In one particularly preferred embodiment, the valve is or comprises a flexible and moulded flow control or dispensing valve, such as a cross-hair or cross-slit valve. In this respect, a cross-slit valve typically comprises a substantially flattened and/or convex (or concave) surface having a pair of intersecting slits arranged substantially perpendicular or angularly to each other in a cross-hair configuration within the surface. This arrangement allows for dispensing of the liquid composition therethrough upon actuation of the pump dispenser by a user. Advantageously, the cross-slit valve also inhibits or prevents the accumulation of residue at the tip of the pump dispenser.

Figure 3:
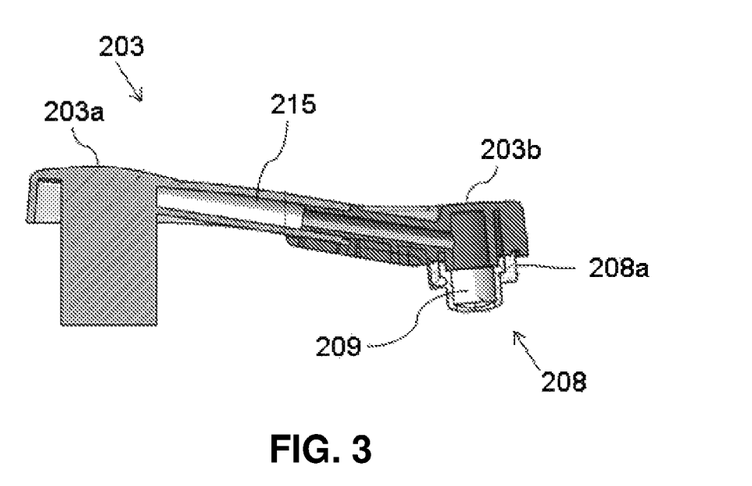
FIG. 3 provides a longitudinal cross-section view of an alternative embodiment of a dispenser tip of a pump dispenser of the invention.
Figure 4:
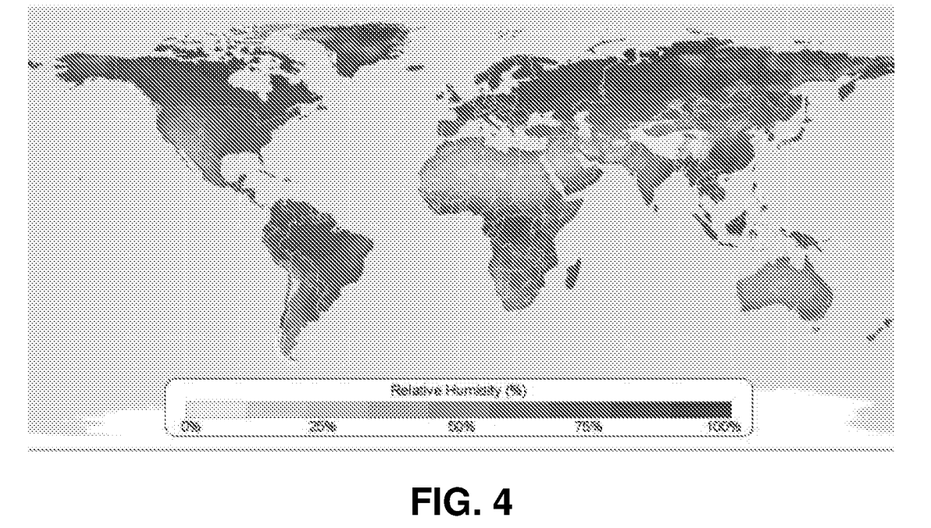
FIG. 4 provides global average annual relative humidity (Source: Centre for Sustainability and the Global Environment, University of Wisconsin-Madison. Data taken from: CRU 0.5 Degree dataset (New et al))

In view of the above and referring to FIG. 3, an alternative embodiment of a dispenser tip 203 is provided. The dispenser tip 203 includes a proximal first portion 203a and a distal second portion 203b engaged theretogether by an interference fit and optionally a mechanical retaining member (not shown), such as a clip or clasp, engaged therearound and at respective free ends thereof. The proximal first portion 203a and the distal second portion 203b define a dispensing channel or conduit 215 extending therethrough and in fluid communication with a distal end portion 208. The distal end portion 208 includes a valve collar 208a for retaining a cross-slit valve 209 adjacent or proximate thereto in a suitable position across an opening or aperture therein.

In the embodiment provided in FIG. 3, the second portion 203b and the distal end portion 208 are preferably configured to be sealingly and substantially irreversibly engaged theretogether. In the embodiment provided, this is achieved, at least in part, by over moulding of the cross-slit valve 209, such that it hooks over and engages the valve collar 208a, which is then ultrasonically welded to a distal free end of the distal second portion 203b. Such an arrangement functions to inhibit or prevent the likelihood of the distal end portion 208 from disengaging from the dispenser tip 203, such as during cleaning of any residue accumulation or use that generates high pressures within the dispensing conduit 215, and representing a potential choking hazard for a vulnerable population of dysphagic patients. This arrangement further aids in hermetically sealing the dispenser tip 203 so as to inhibit or prevent drying out of the liquid composition therein. It will be appreciated that in alternative embodiments, the first portion 203a, the second portion 203b and/or the distal end portion may be integrally formed theretogether. Preferably, the first portion 203a, second portion 203b and/or the distal end portion 208 are not sealingly and substantially irreversibly engaged theretogether by way of an adhesive agent, such as a food-grade adhesive agent, as are known in the art. To this end, such adhesive agent are typically not compatible with the liquid composition and/or may degrade over time.

Figure 5:
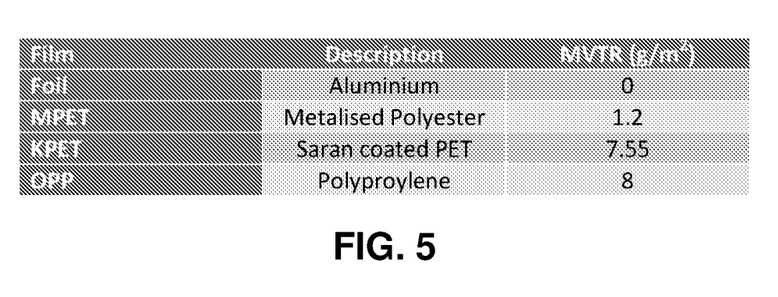
FIG. 5 provides typical moisture vapour transfer rates (MVTR) of food grade film structures.

It would be appreciated that alternative delivery systems of the liquid composition of the invention that prevent or inhibit the drying out thereof are contemplated. These may include, for example, volumetric sachets made from moisture barrier laminate films, which can be opened and dispensed into the required foodstuff. Typical moisture vapour transfer rates of several common films used in sachets are listed in FIG. 5. It would be understood that this list is not intended to be exhaustive. Additionally, those of skill in the art would appreciate that the vapour transfer rate is relative to the thickness of the films used in the sachet as well as any laminate combinations thereof.

In a related aspect, the invention provides a method of delivering a stable liquid composition to an aqueous liquid or aqueous liquid solid mixture foodstuff comprising the steps of:

(a) providing a container containing the stable liquid composition, said composition for increasing the viscosity of said foodstuff and having a viscosity of less than 2000 cP and a water activity of greater than 95%, wherein the composition comprises: (i) one or a plurality of thickening agents selected from the group consisting of agar, alginic acid, carrageenan, guar gum, gum tragacanth, gum ghatti, microcrystalline cellulose, sodium carboxymethylcellulose, methyl cellulose, hydroxypropylmethylcellulose, hydroxypropylcellulose, methylethylcellulose, gum karaya, locust bean gum, tara gum, psyllium seed gum, quince seed gum, a pectin, furcellaran, gellan gum, konjac, sodium alginate, xanthan gum and any combination thereof; and (ii) one or a plurality of polysaccharides or extracts thereof selected from the group consisting of scleroglucan, dextran, elsinan, soy bean polysaccharide, levan, an arabinogalactan, alternan, inulin, a gluco-oligosaccharide, pullulan, an arabinoxylan, curdlan, low viscosity carboxymethylcellulose (CMC), an *Acacia* gum, a *Larix occidentalis* polysaccharide extract, a *Larix laricina* polysaccharide extract, a *Larix decidua* polysaccharide extract, a *Larix sibirica* polysaccharide extract and any combination thereof, wherein the container is further sealingly attached to a pump dispenser, said dispenser comprising a valve for inhibiting or preventing drying of the composition in the container, and (b) applying a force to the pump dispenser to thereby deliver a predetermined volume of the composition to the foodstuff.

Suitably, the container, pump dispenser and/or valve of the present aspect are that previously described herein.

Suitably, the method further comprises the step of applying low-shear mixing to the foodstuff and the composition so as to promote increasing the viscosity of said foodstuff by the composition.

As generally used herein, the term "low shear mixing" refers to non-turbulent or minimally turbulent mixing, such as gentle mixing or stirring with a spoon or the like. It would be understood that low-shear mixing may be defined in terms of shear rates and typically is a function of a number of variables, such as mixing vessel configuration and mixing device speed.

Accordingly, in particular embodiments the low-shear mixing comprises stirring at a speed of from about 10 rpm to about 40 rpm (e.g., about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40 rpm or any range therein).

Suitably, the low-shear mixing is applied for about 60 seconds or less to achieve a maximal or near-maximal increase in viscosity of the foodstuff. Preferably, the low-shear mixing is applied for about 10 to about 40 seconds (e.g., about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40 seconds or any range therein) to achieve a maximal or near maximal viscosity of the foodstuff.

In another aspect, the invention provides a method for increasing the viscosity of an aqueous liquid or aqueous liquid solid mixture foodstuff, the method including the steps of:

(a) adding to the foodstuff a stable liquid composition having a viscosity of less than 2000 cP and a water activity of greater than 95%, the composition comprising: (i) one or a plurality of thickening agents selected from the group consisting of agar, alginic acid, carrageenan, guar gum, gum tragacanth, gum ghatti, microcrystalline cellulose, sodium carboxymethylcellulose, methyl cellulose, hydroxypropylmethylcellulose, hydroxypropylcellulose, methylethylcellulose, gum karaya, locust bean gum, tara gum, psyllium seed gum, quince seed gum, a pectin, furcellaran, gellan gum, konjac, sodium alginate, xanthan gum and any combination thereof; and (ii) one or a plurality of polysaccharides or extracts thereof selected from the group consisting of scleroglucan, dextran, elsinan, soy bean polysaccharide, levan, an arabinogalactan, alternan, inulin, a gluco-oligosaccharide, pullulan, an arabinoxylan, curdlan, low viscosity carboxymethylcellulose (CMC), an *Acacia* gum, a *Larix occidentalis* polysaccharide extract, a *Larix laricina* polysaccharide extract, a *Larix decidua* polysaccharide extract, a *Larix sibirica* polysaccharide extract and any combination thereof; and (b) applying low-shear mixing to the foodstuff and the stable liquid composition so as to promote increasing the viscosity of said foodstuff by the stable liquid composition.

Suitably, the low-shear mixing is applied for about 60 seconds or less or more preferably about 30 seconds or less to achieve a maximal viscosity of the foodstuff. Preferably, the low-shear mixing is applied for about 10 to about 30 seconds to achieve a maximal viscosity of the foodstuff.

It would be appreciated that the low-shear mixing is suitably of a value that is sufficient to promote the physical removal of the polysaccharide from its inhibitory interaction site on the one or plurality of thickening agents, so as to allow said thickening agents to exert their desired effect of increasing the relevant liquid or semi-liquid's foodstuffs viscosity. In particular embodiments, the low-shear mixing comprises stirring said composition at a speed of from about 10 rpm to about 40 rpm.

In a final aspect, the invention provides a stable liquid composition having a viscosity of less than 2000 cP and a water activity of greater than 95%, the composition comprising: (i) one or a plurality of thickening agents selected from the group consisting of agar, alginic acid, carrageenan, guar gum, gum tragacanth, gum ghatti, microcrystalline cellulose, sodium carboxymethylcellulose, methyl cellulose, hydroxypropylmethylcellulose, hydroxypropylcellulose, methylethylcellulose, gum karaya, locust bean gum, tara gum, psyllium seed gum, quince seed gum, a pectin, furcellaran, gellan gum, konjac, sodium alginate, xanthan gum and any combination thereof; and (ii) one or a plurality of polysaccharides or extracts thereof selected from the group consisting of scleroglucan, dextran, elsinan, soy bean polysaccharide, levan, an arabinogalactan, alternan, inulin, a gluco-oligosaccharide, pullulan, an arabinoxylan, curdlan, low viscosity carboxymethylcellulose (CMC), an *Acacia* gum, a *Larix occidentalis* polysaccharide extract, a *Larix laricina* polysaccharide extract, a *Larix decidua* polysaccharide extract, a *Larix sibirica* polysaccharide extract and any combination thereof, wherein addition of the composition to an aqueous liquid or aqueous liquid solid mixture foodstuff increases the viscosity of said foodstuff.

The liquid composition of the above aspects may be stored and/or delivered by any means known in the art. In particular embodiments, the liquid composition is stored and/or delivered by a container and pump dispenser arrangement, such as that hereinbefore described. In alternative embodiments, the liquid composition is stored and/or delivered by a sachet or the like, such as that provided herein.

Suitably, the liquid composition described herein when added in a desirable amount to an aqueous liquid or aqueous liquid solid mixture foodstuff does not alter particular desirable attributes thereof, such as the original flavour and/or colour of the foodstuff, that may be attractive to the consumer. In this regard, the liquid composition preferably makes little or no flavour and/or colour contribution to said foodstuff when added in a desirable amount thereto. Additionally, it is preferable that the amount of the liquid composition to be added to a foodstuff to achieve a desirable viscosity thereof is as small as possible so as to avoid diluting the flavour and/or colour characteristics of the foodstuff. To this end, gel thickeners of the prior art, such as that described in Holahan, require significantly higher volumes than that of the present liquid composition to be added to the foodstuff to achieve the requisite level of thickening and, as such, typically result in the dilution of the flavor and/or colour characteristics of said foodstuff.

With regard to the present invention, the liquid composition described herein is suitably flowable. To this end, the liquid composition of the present invention suitably has a viscosity of less than 3000 cP and more preferably less than 2000 cP. Advantageously, a liquid composition of such a viscosity that may be dispensed easily, such as from a pump dispenser or a sachet, as well as being able to be dispersed with little or no agitation (i.e., a low shear mixing force) when added in a desired amount to an aqueous liquid or aqueous liquid solid mixture foodstuff. Further, the liquid composition of the invention is concentrated and can accommodate a relatively higher percentage of thickening agent without losing the flowable character of the composition. This further enables easy and accurate dispensing of the liquid composition into the foodstuff of choice.

In certain embodiments of the aforementioned aspects, the liquid composition has a viscosity of about 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, 2000, 2050, 2100, 2150, 2200, 2250, 2300, 2350, 2400, 2450, 2500, 2550, 2600, 2650, 2700, 2750, 2800, 2850, 2900, 2950, 3000 cP, or any range therein. Preferably, the liquid composition has a viscosity of between about 500 cP to about 1500 cP. More preferably, the liquid composition has a viscosity of between about 800 cP to about 1400 cP. Even more preferably, the liquid composition has a viscosity of between about 1200 to about 1300 cP In one preferred embodiment, the liquid composition is of a viscosity that is pump dispensable.

The viscosity of the liquid composition may be measured by any means known in the art. By way of example, viscosity may be measured using a Bostwick Consistometer, a Brookfield Viscometer, a rheometer or similar device. Preferably, viscosity is measured in absolute centipoise as provided by a rheometer, rather than relative centipoise as measured by a viscometer. It would be appreciated by the skilled artisan that a rheometer measurement represents the best and therefore standard method for determining foodstuff viscosity.

Suitably, the liquid composition described herein increases the viscosity of the aqueous liquid or aqueous liquid solid mixture foodstuff to greater than 95 cP. It is an advantage of the present approach that the inhibition of the expression, by the thickening agent, of its viscosity due to the polysaccharide is effectively lifted by gentle mixing of the liquid composition into the liquid or liquid solid foodstuff. This allows the thickening agent to quickly express its viscosity, due to the controlled release of the viscosity inhibitory effect of the polysaccharide on the thickening agent, and therefore aids in its easy and rapid incorporation into the foodstuff. This is an advantage over thickening agents which are substantially full hydrated prior to being added to a foodstuff, such as that described in Holahan, and can therefore be challenging to incorporate into the foodstuff in a smooth and time efficient manner. Furthermore, the complete expression of viscosity by fully hydrated thickening agents is in itself an obstacle to the easy and rapid development of increased viscosity when it is diluted with a liquid or liquid solid foodstuff.

Therefore, it will be clear that in any of the aforementioned aspects, the thickening agent in the composition is not fully hydrated prior to its addition to the foodstuff.

In certain embodiments, the viscosity of said foodstuff, upon addition of the liquid composition, is increased to at least 95, 100, 110, 120, 130, 140, 150, 175, 200, 250, 300, 350, 400, 450, 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, 2000, 2050, 2100, 2150, 2200, 2250, 2300, 2350, 2400, 2450, 2500, 2550, 2600, 2650, 2700, 2750, 2800, 2850, 2900, 2950, 3000 cP, or any range therein.

For the purposes of the present invention, the thickening agent, may be present in an amount from about 3% to about 30% or any range therein such as, but not limited to, about 5% to about 15%, or about 7% to about 12% by weight of the liquid composition. In particular embodiments of the present invention, the thickening agent is present in an amount of about 3.0%, 3.5%, 4.0%, 4.5%, 5.0%, 5.5%, 6.0%, 6.5%, 7.0%, 7.5%, 8.0%, 8.5%, 9.0%, 9.5%, 10.0%, 10.5%, 11.0%, 11.5%, 12.0%, 12.5%, 13.0%, 13.5%, 14.0%, 14.5%, 15.0%, 15.5%, 16.0%, 16.5%, 17.0%, 17.5%, 18.0%, 18.5%, 19.0%, 19.5%, 20.0%, 20.5%, 21.0%, 21.5%, 22.0%, 22.5%, 23.0%, 23.5%, 24.0%, 24.5%, 25.0%, 25.5%, 26.0%, 26.5%, 27.0%, 27.5%, 28.0%, 28.5%, 29.0%, 29.5%, 30.0%, or any range therein, by weight of the liquid composition. In certain embodiments of the present invention, the thickening agent is present in an amount of about 3% to about 20% by weight of the liquid composition.

For the present invention, the polysaccharide is suitably present in a high enough concentration that does not significantly contribute to the viscosity of the liquid composition. To this end, the polysaccharide described herein may be present in an amount from about 3% to about 30% or any range therein such as, but not limited to, about 5% to about 20%, or about 7.5% to about 17.5% by weight of the liquid composition.

In particular embodiments of the present invention, the polysaccharide described herein is present in an amount of about 3.0%, 3.5%, 4.0%, 4.5%, 5.0%, 5.5%, 6.0%, 6.5%, 7.0%, 7.5%, 8.0%, 8.5%, 9.0%, 9.5%, 10.0%, 10.5%, 11.0%, 11.5%, 12.0%, 12.5%, 13.0%, 13.5%, 14.0%, 14.5%, 15.0%, 15.5%, 16.0%, 16.5%, 17.0%, 17.5%, 18.0%, 18.5%, 19.0%, 19.5%, 20.0%, 20.5%, 21.0%, 21.5%, 22.0%, 22.5%, 23.0%, 23.5%, 24.0%, 24.5%, 25.0%, 25.5%, 26.0%, 26.5%, 27.0%, 27.5%, 28.0%, 28.5%, 29.0%, 29.5%, 30.0%, or any range therein, by weight of the liquid composition. In certain embodiments of the present invention, the polysaccharide described herein is present in an amount of about 3% to about 20% by weight of the liquid composition. If the concentration of the polysaccharide is below this range, the liquid composition typically forms a viscous solution and loses fluidity when the thickening agent is added.

Preferably, the polysaccharide is included in an amount such that the stable liquid composition has a lower viscosity than that of the liquid composition were it to comprise the thickening agent only with water or another suitable aqueous solution. More preferably, the polysaccharide decreases the viscosity of the stable liquid composition to at least a third of that of the liquid composition were it to comprise the thickening agent only with water or another suitable aqueous solution. In particular embodiments, the polysaccharide decreases the viscosity of the stable liquid composition to at least about 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40% or any range therein, of that of the liquid composition were it to comprise the thickening agent only with water or another suitable aqueous solution.

Suitably, the composition referred to herein is stable for at least six months and up to at least two years at room temperature. Because the composition of the invention is stable, without significant degradation in the performance of the thickening agent, the viscosity remains constant for a commercially reasonable period of time. Accordingly, the formulation can be provided as a packaged product per se, such as in a metered pump dispenser or in a sachet, to the end user. To this end, the end user can reliably calculate the amount of the liquid composition of the invention to add to a food or beverage to achieve a desired end viscosity thereof. The liquid composition of the invention is then easily dispensed and easily mixed into the foodstuff to give the desired end product.

As described earlier, the ability to package and use the liquid composition in this way is a result of the combined presence of the thickening agent and polysaccharide which inhibits the expression of the viscosity of the thickening agent until released through the application of low shear mixing and provides distinct benefits in use over traditional sachets of powdered or gel-like thickener which are notoriously difficult to measure out accurately, when the exact pack size is not appropriate, and to incorporate into liquid foodstuffs.

Stability of the liquid composition of the invention over time may be indicated by the retention of colour (if any), flavour (if any), separation (if any), microbiological spoilage (if any), viscosity and/or clarity of the liquid composition. Additionally or alternatively, stability of the liquid composition may be determined by the ability of the composition to impart viscosity consistently and repeatably to a predetermined level when added to a foodstuff. The stability of the liquid composition can be determined by using any of the techniques available to a person skilled in art of food science, including microbiological testing to measure the extent and rate of microbiological spoilage; visual inspection for physical changes such as separation and/or sedimentation; sensory evaluation to determine colour, flavour and/or clarity changes; and viscosity measurement using a Bostwick Consistometer, Brookfield Viscometer, a rheometer or similar device.

With respect to stability, the liquid composition of the invention may further comprise a food-grade preservative, as are well known in the art. Suitable food grade preservatives include, but are not limited to, gellan gum, vitamin E, potassium sorbate, sodium benzoate, sodium metabisulphite, methyl paraben, EDTA, sulphur dioxide, nisin and propionic acid. In one preferred embodiment, the food-grade preservative is or comprises gellan gum. The amount of preservative in the liquid composition may range from about 0.001 to about 0.1 percent by weight of the total weight of the liquid composition.

Again, in regards to the stability, the liquid composition described herein suitably is of a pH between about 3.0 and about 7.5 (e.g., 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5 and any range therein). Preferably, the pH of the liquid composition is between about 4 and 4.4. To this end, the acidic pH of the liquid composition may be achieved by any means known in the art.

Suitably, the liquid composition of the aforementioned aspects is added to an aqueous liquid or aqueous liquid solid mixture foodstuff for feeding to a subject suffering from a mastication and/or deglutition disease, disorder or condition. Preferably, the mastication and/or deglutition disease, disorder or condition is or comprises dysphagia. As such, it is preferable for this use that the liquid composition is separated into appropriate individual portions, such as sachets, or be pump dispensable.

It would be readily understood that dysphagia is a condition where the process of swallowing is impaired. During eating, this can lead to the entry of liquid or solid food into the trachea and subsequently the lungs of the sufferer potentially leading to aspiration pneumonia. Dysphagia can occur at any age, but is most common in the elderly, especially if they have suffered a stroke or have dementia. One management strategy for suffers of dysphagia is to consume foods that are texture modified (i.e., thickened foods and beverages) that slow the swallowing reflex and allow the windpipe time to close before the food passes, thereby preventing aspiration.

Throughout the specification the aim has been to describe the preferred embodiments of the invention without limiting the invention to any one embodiment or specific collection of features. It will therefore be appreciated by those of skill in the art that, in light of the instant disclosure, various modifications and changes can be made in the particular embodiments exemplified without departing from the scope of the present invention.

All computer programs, algorithms, patent and scientific literature referred to herein is incorporated herein by reference.

Any reference to publications cited in this specification is not an admission that the disclosures constitute common general knowledge in Australia.

In order that the invention may be more readily understood and put into practice, one or more preferred embodiments thereof will now be described, by way of example only.

Example 1: Composition and Method of Manufacture and Use

*Larix occidentalis* polysaccharide extract—20% by weight

Xanthan Gum—7% by weight

Citric Acid—0.3% by weight

Potassium sorbate—0.07% by weight

Water—72.63%

Gellan gum—0.08%

The *Larix occidentalis* polysaccharide extract is first dissolved in water, followed by citric acid and potassium sorbate. Xanthan gum is then added. The mixture is then heated to 80° C. with agitation and gellan gum is added. The liquid thickener composition may then be hot filled into a container, and closed using a lid with a hermetic seal.

When the container is opened it can be fitted with an appropriately sealed pump, such as that shown in FIG. 2, that can deliver 7 g+/−3% of the liquid thickener by weight. When 7 g of the above liquid thickener concentrate was added to 100 ml of water and gently stirred for 30 secs to instantly to release the viscosity inhibition of the polysaccharide, it produced thickened water with a viscosity of 160 cps. Similarly, 7 g of the above mentioned liquid thickener concentrate can be added to 100 mls of milk, or juice, or cordial or other beverage and gently stirred for 30 secs to instantly release the viscosity inhibition of the polysaccharide to produce a thickened milk, juice, cordial or other beverage of 160 cps.

Example 2: Stability Comparison of Uzuhashi Embodiment Versus the Present Invention The present example relates to the second method described in the Detailed Description of the Preferred Embodiments (column 4 line 26) of U.S. Pat. No. 6,455,090 (hereinafter "Uzuhashi") and compares it with the formulation of Example 1 above of an acidified and preservatised solution of thickening agents and viscosity inhibiting polysaccharide as provided for by the present invention.

Uzahashi describes methods for producing a liquid thickening agent, which can thicken when added to a liquid and is initially inhibited from forming viscous solutions or gels. The inventors claim that the invention can be added suitably to a liquid or semi-liquid foodstuff for a patient who has mastication and deglutition difficulties.

Microbiological Stability

TABLE 1

| Time (in weeks) to Develop Evidence of Microbiological Growth* | |
|---|---|
| Uzuhashi Embodiment | Example 1 Embodiment |
| Less than 1 (about 2 days at 25 C.) | Greater than 52 at 25 C. |

*The development of microbiological growth is first detected by the presence of microbial fermentation as demonstrated by the appearance of gas (e.g., $CO_2$) being produced and the development of "off" odours in the solution.

Physical Stability

Physical stability of the respective formulations was evidenced by separation of the thickening agent(s) from the viscosity inhibiting polysaccharide. To this end, the viscosity (as measured by Bostwick Consistometer after 30 seconds of flow) of a 20 g sample of the liquid thickener was taken from the bottom of the container and mixed onto 100 mls of water (Note: increasing Bostwick readings indicate a reduction (thinning) of viscosity).

TABLE 2

Physical stability over time.

| Weeks of Storage | Uzuhashi Embodiment | Example 1 Embodiment |
|---|---|---|
| 1 | 16.5 cms | 16.0 cm |
| 2 | 18 cms | 16.0 cm |
| 3 | 22 cms | 16.0 cm |
| 4 | >24 cms* | 16.0 cm |
| 5 | >24 cms* | 16.0 cm |
| 6 | >24 cm* | 16.0 cm |

*A Bostwick Consistometer's limit of reading for thin fluids is 24 cms.

After 4 weeks, the Uzuhashi embodiment continued to produce thinner viscosities even though the Bostwick reading shows no change. After 8 weeks, the separation layer at the bottom of the Uzuhashi embodiment only contained a clear layer of the viscosity inhibiting polysaccharide and no thickening agent, whereas the formulation of Example 1 remains physically stable for greater than 52 weeks.

Accordingly, the invention disclosed in Uzahashi is limited in that the thickening agent described therein exhibits neither microbial nor physically stability. As such, the liquid thickener of Uzahashi has no practical utility in the management of swallowing disorders (dysphagia) so as to prevent or limit common co-morbidities of the condition. This lack of utility is two-fold. Firstly, the lack of physical stability and resultant separation of the solvent and gelling agents prohibits accurate dosing of Uzuhashi's liquid thickener. As such the invention as disclosed cannot consistently guarantee to meet the required levels with regard to predetermined viscosity of the resultant thickened food. Secondly, patients such as those described herein are typically vulnerable populations. As such they are governed by legislative instruments such as the *NSW Food Authority—Guidelines for food service to vulnerable persons*. The liquid thickener composition of Uzahashi is not microbiologically stabile and thus could not be administered clinically to the intended population as described.

Example 3: Mixing Rate and Viscosity Build Comparative Data

TABLE 3

Time (in seconds) to achieve maximum viscosity when 5 g of liquid or powder thickener is added to 100 ml of water using the indicated mixing rate

| | Mixing Rate | | |
|---|---|---|---|
| Description of Thickener | Gentle 10-40 rpm | Moderate 40-180 rpm | Brisk Greater than 180 rpm |
| Example 1 formulation | 31 | 19 | 12 |
| Uzuhashi Embodiment | 123 | 67 | 33 |
| Agglomerated Powder Thickener (Resource ThickenUp Clear) | 241 | 186 | 121 |

As can be seen from the above table, the Example 1 formulation is significantly quicker at achieving maximum viscosity when added to water than the other two prior art thickener compositions.

The invention claimed is:

1. A storage and delivery system for a stable liquid composition, comprising:
   (a) a container containing the stable liquid composition, said composition for increasing the viscosity of an aqueous liquid or aqueous liquid solid mixture foodstuff, wherein the composition is stable for at least six months at room temperature and wherein the composition comprises a viscosity of less than 2000 cP and a water activity of greater than 95%, wherein the composition comprises: (i) one or a plurality of thickening agents selected from the group consisting of agar, alginic acid, carrageenan, guar gum, gum tragacanth, gum ghatti, microcrystalline cellulose, methyl cellulose, hydroxypropylmethylcellulose, hydroxypropylcellulose, methylethylcellulose, gum karaya, locust bean gum, tara gum, psyllium seed gum, quince seed gum, a pectin, furcellaran, gellan gum, konjac, sodium alginate, xanthan gum and any combination thereof, wherein the concentration of said thickening agents is about 3% to about 30% by weight; (ii) one or a plurality of polysaccharides or extracts thereof selected from the group consisting of scleroglucan, dextran, elsinan, soy bean polysaccharide, levan, an arabinogalactan, alternan, inulin, pullulan, an arabinoxylan, curdlan, low viscosity carboxymethylcellulose (CMC), an *Acacia* gum, a *Larix occidentalis* polysaccharide extract, a *Larix laricina* polysaccharide extract, a *Larix decidua* polysaccharide extract, a *Larix sibirica* polysaccharide extract and any combination thereof, wherein said polysaccharides or extracts thereof comprises 10 to over 100,000 saccharide units and the concentration of said polysaccharides or extracts thereof is about 3% to about 30% by weight; and (iii) water and/or a food grade aqueous solution; and
   (b) a pump dispenser sealingly attached to the container, said dispenser comprising a valve for inhibiting or preventing drying of the composition in the container.

2. The system of claim 1, wherein the composition is configured to be delivered in one or more doses of a predetermined volume to the foodstuff.

3. The system of claim 2, wherein one, two and three doses of the predetermined volume of the composition increase the viscosity of said foodstuff to first, second and third viscosity levels respectively, wherein the first viscosity level is about 120 to about 180 mPa·s, the second viscosity level is about 350 to about 450 mPa·s, and the third viscosity level is about 850 to about 950 mPa·s.

4. A method of delivering a stable liquid composition to an aqueous liquid or aqueous liquid solid mixture foodstuff comprising the steps of:
(a) providing a container containing the stable liquid composition, said composition for increasing the viscosity of said foodstuff and having a viscosity of less than 2000 cP and a water activity of greater than 95%, wherein the composition is stable for at least six months at room temperature and wherein the composition comprises: (i) one or a plurality of thickening agents selected from the group consisting of agar, alginic acid, carrageenan, guar gum, gum tragacanth, gum ghatti, microcrystalline cellulose, methyl cellulose, hydroxypropylmethylcellulose, hydroxypropylcellulose methylethylcellulose, gum karaya, locust bean gum, tara gum, psyllium seed gum, quince seed gum, a pectin, furcellaran, gellan gum, konjac, sodium alginate, xanthan gum and any combination thereof, wherein the concentration of said thickening agents is about 3% to about 30% by weight; and (ii) one or a plurality of polysaccharides or extracts thereof selected from the group consisting of scleroglucan, dextran, elsinan, soy bean polysaccharide, levan, an arabinogalactan, alternan, inulin, pullulan, an arabinoxylan, curdlan, low viscosity carboxymethylcellulose (CMC), an *Acacia* gum, a *Larix occidentalis* polysaccharide extract, a *Larix laricina* polysaccharide extract, a *Larix decidua* polysaccharide extract, a *Larix sibirica* polysaccharide extract and any combination thereof, wherein said polysaccharide or extracts thereof comprises 10 to over 100,000 saccharide units and the concentration of said polysaccharide or extracts thereof is about 3% to about 30% by weight; and (iii) water and/or a food grade aqueous solution wherein the container is further sealingly attached to a pump dispenser, said dispenser comprising a valve for inhibiting or preventing drying of the composition in the container; and
(b) applying a force to the pump dispenser to thereby deliver one or more doses of a predetermined volume of the composition to the foodstuff.

5. The method of claim 4, wherein one, two and three doses of the predetermined volume of the composition increase the viscosity of said foodstuff to first, second and third viscosity levels respectively and wherein a nonlinear relationship exists between the first, second and third viscosity levels.

6. The method of claim 4, wherein the valve is or comprises a self-sealing valve.

7. The method of claim 4, wherein the dispenser comprises a dispenser tip, the dispenser tip including the valve disposed therein.

8. The method of claim 4, wherein the valve is selected from the group consisting of a cross-slit valve, a ball valve, a flapper valve, an umbrella valve, a duck bill valve, a reed valve and any combination thereof.

9. The method of claim 4, wherein said valve is biased to a closed position and is actuated to an open position upon application of a force to the pump dispenser forcing said composition to flow through the valve.

10. A method for increasing the viscosity of an aqueous liquid or aqueous liquid solid mixture foodstuff, the method including the steps of:
(a) adding to the foodstuff a stable liquid composition having a viscosity of less than 2000 cP and a water activity of greater than 95%, wherein the composition is stable for at least six months at room temperature and the composition comprising: (i) one or a plurality of thickening agents selected from the group consisting of agar, alginic acid, carrageenan, guar gum, gum tragacanth, gum ghatti, microcrystalline cellulose, methyl cellulose, hydroxypropylmethylcellulose, hydroxypropylcellulose, methylethylcellulose, gum karaya, locust bean gum, tara gum, psyllium seed gum, quince seed gum, a pectin, furcellaran, gellan gum, konjac, sodium alginate, xanthan gum and any combination thereof, wherein the concentration of said thickening agents is about 3% to about 30% by weight; (ii) one or a plurality of polysaccharides or extracts thereof selected from the group consisting of scleroglucan, dextran, elsinan, soy bean polysaccharide, levan, an arabinogalactan, alternan, inulin, pullulan, an arabinoxylan, curdlan, low viscosity carboxymethylcellulose (CMC), an *Acacia* gum, a *Larix occidentalis* polysaccharide extract, a *Larix laricina* polysaccharide extract, a *Larix decidua* polysaccharide extract, a *Larix sibirica* polysaccharide extract and any combination thereof, wherein said polysaccharide or extracts thereof comprises 10 to over 100,000 saccharide units and the concentration of said polysaccharide or extracts thereof is about 3% to about 30% by weight; and (iii) water and/or a food grade aqueous solution; and
(b) applying low-shear mixing to the foodstuff and the composition so as to promote increasing the viscosity of said foodstuff by the composition.

11. A method for feeding a subject suffering from a mastication and/or deglutition disease, disorder or condition, comprising feeding the subject a foodstuff having increased viscosity due to addition of a stable liquid composition, wherein the composition comprises a viscosity of less than 2000 cP and a water activity of greater than 95%, wherein the composition is stable for at least six months at room temperature and wherein the composition comprises: (i) one or a plurality of thickening agents selected from the group consisting of agar, alginic acid, carageenan, guar gum, gum tragacanth, gum ghatti, microcrystalline cellulose, methyl cellulose, hydroxypropylmethylcellulose, hydroxypropylcellulose, methylethylcellulose, gum karaya, locust bean gum, tara gum, psyllium seed gum, quince seed gum, a pectin, furcellaran, gellan gum, konjac, sodium alginate, xanthan gum and any combination thereof, wherein the concentration of said thickening agents is about 3% to about 30% by weight; (ii) one or a plurality of polysaccharides or extracts thereof selected from the group consisting of scleroglucan, dextran, elsinan, soy bean polysaccharide, levan, an arabinogalactan, alternan, inulin, pullulan, an arabinoxylan, curdlan, low viscosity carboxymethylcellulose (CMC), an *Acacia* gum, a *Larix occidentalis* polysaccharide extract, a *Larix laricina* polysaccharide extract, a *Larix decidua* polysaccharide extract, a *Larix sibirica* polysaccharide extract and any combination thereof, wherein said polysaccharide or extracts thereof comprises 10 to over 100,000 saccharide units and the concentration of said polysaccharide or extracts thereof is about 3% to about 30% by weight; and (iii) water and/or a food grade aqueous solution.

12. The method of claim 11, wherein the mastication and/or deglutition disease, disorder or condition is or comprises dysphagia.

13. The system of claim 1, wherein the valve is or comprises a self-sealing valve.

14. The system of claim 1, wherein the dispenser comprises a dispenser tip, the dispenser tip including the valve disposed therein.

15. The system of claim 1, wherein the valve is selected from the group consisting of a cross-slit valve, a ball valve, a flapper valve, an umbrella valve, a duck bill valve, a reed valve and any combination thereof.

16. The system of claim 1, wherein said valve is biased to a closed position and is actuated to an open position upon application of a force to the pump dispenser forcing said composition to flow through the valve.

17. The method of claim 5, wherein the first viscosity level is about 120 to about 180 mPa·s, the second viscosity level is about 350 to about 450 mPa·s, and the third viscosity level is about 850 to about 950 mPa·s.

* * * * *

UNITED STATES PATENT AND TRADEMARK OFFICE
CERTIFICATE OF CORRECTION

| | |
|---|---|
| PATENT NO. | : 11,388,920 B2 |
| APPLICATION NO. | : 16/330664 |
| DATED | : July 19, 2022 |
| INVENTOR(S) | : Tristram et al. |

It is certified that error appears in the above-identified patent and that said Letters Patent is hereby corrected as shown below:

On the Title Page

(56) References Cited, OTHER PUBLICATIONS, Office Action corresponding to Chinese Application cite: Please correct "2017300676675" to read --2017800676675--

In the Specification

Column 6, Line 55: Please correct "aw" to read --$a_w$--

In the Claims

Column 19, Line 41, Claim 4: Please correct "solution wherein" to read --solution, wherein--

Signed and Sealed this
Fifteenth Day of November, 2022

*Katherine Kelly Vidal*
Katherine Kelly Vidal
*Director of the United States Patent and Trademark Office*